US012670685B2

(12) United States Patent
Fukuda

(10) Patent No.: US 12,670,685 B2
(45) Date of Patent: Jun. 30, 2026

(54) IMAGE PROCESSING APPARATUS, METHOD OF CONTROLLING THE SAME, AND A NON-TRANSITORY COMPUTER-READABLE STORAGE MEDIUM THAT OUTPUT INFERENCE RESULTS AND STORE MANAGEMENT INFORMATION OF IMAGES

(71) Applicant: CANON KABUSHIKI KAISHA, Tokyo (JP)

(72) Inventor: Atsushi Fukuda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 278 days.

(21) Appl. No.: 18/062,135

(22) Filed: Dec. 6, 2022

(65) Prior Publication Data

US 2023/0196708 A1 Jun. 22, 2023

(30) Foreign Application Priority Data

Dec. 16, 2021 (JP) ................................. 2021-204438

(51) Int. Cl.
*G06V 10/25* (2022.01)
*G06T 7/62* (2017.01)
(Continued)

(52) U.S. Cl.
CPC ................ *G06V 10/25* (2022.01); *G06T 7/62* (2017.01); *G06V 10/26* (2022.01); *G06V 10/764* (2022.01); *G06V 2201/07* (2022.01)

(58) Field of Classification Search
CPC ...... G06V 10/25; G06V 10/26; G06V 10/764; G06V 2201/07; G06V 40/10; G06T 7/62; H04N 5/76; H04N 5/77; G06N 5/04
(Continued)

(56) References Cited

U.S. PATENT DOCUMENTS 6,282,317 B1 8/2001 Luo et al.
6,704,464 B2 * 3/2004 Ohdate ................... G06F 16/58
707/E17.026
(Continued)

FOREIGN PATENT DOCUMENTS

CN 104980631 A 10/2015
JP 2006-195632 A 7/2006
(Continued)

OTHER PUBLICATIONS

Extended European Search Report, dated Mar. 23, 2303, issued in counterpart European patent application No. 22209911.1 (7 pages).
(Continued)

*Primary Examiner* — Henok Shiferaw
*Assistant Examiner* — Dion J Satcher
(74) *Attorney, Agent, or Firm* — Venable LLP

(57) ABSTRACT

An image processing apparatus includes a memory storing a program that, when executed, causes processor(s) to detect subjects from an image, to classify the detected subjects by performing inference processing to output first and second inference results, to generate an image file including image data of the image and the first inference results without the second, and to record the image file in a recording medium, and to store management information, including information specifying the image file and the second inference results in a management file different from the image file and that is recorded in the recording medium. The management file includes management information of a plurality of the images. The first inference results are results of the inference processing for a main subject among the detected subjects and the second inference results are results of the inference processing for subjects for the detected subjects other than the subject.

13 Claims, 7 Drawing Sheets

(51) Int. Cl.
    *G06V 10/26*        (2022.01)
    *G06V 10/764*     (2022.01)

(58) Field of Classification Search
    USPC ......................................................... 382/103
    See application file for complete search history.

(56)            References Cited

U.S. PATENT DOCUMENTS

| | | | | |
|---|---|---|---|---|
| 8,400,652 | B2 * | 3/2013 | Izawa | H04M 1/72409 |
| | | | | 358/1.15 |
| 9,811,753 | B2 * | 11/2017 | Venkataraman | H04N 19/625 |
| 9,826,111 | B2 * | 11/2017 | Suzuki | H04N 1/00456 |
| 10,798,293 | B2 * | 10/2020 | Sudo | G03B 13/36 |
| 2005/0289117 | A1 * | 12/2005 | Hiraishi | G06F 16/958 |
| 2006/0227384 | A1 | 10/2006 | Kawada | |
| 2008/0024643 | A1 | 1/2008 | Kato | |
| 2010/0111489 | A1 * | 5/2010 | Presler | H04N 5/772 |
| | | | | 348/222.1 |
| 2012/0206619 | A1 * | 8/2012 | Nitta | H04N 23/61 |
| | | | | 348/222.1 |
| 2013/0300864 | A1 * | 11/2013 | Ko | H04L 41/0879 |
| | | | | 348/207.1 |
| 2016/0140146 | A1 * | 5/2016 | Wexler | G06F 16/5846 |
| | | | | 707/741 |
| 2017/0105042 | A1 * | 4/2017 | Toma | G11B 27/3027 |
| 2019/0019019 | A1 * | 1/2019 | Nishikawa | G06V 20/53 |
| 2019/0042959 | A1 * | 2/2019 | Kawagishi | G16H 50/20 |
| 2019/0244063 | A1 | 8/2019 | Sakuragi | |
| 2019/0258852 | A1 * | 8/2019 | Shimauchi | G06T 7/292 |
| 2020/0242154 | A1 * | 7/2020 | Haneda | G06F 16/535 |
| 2020/0250451 | A1 * | 8/2020 | Oda | G06V 10/87 |

FOREIGN PATENT DOCUMENTS

| | | | | |
|---|---|---|---|---|
| JP | 2010-039724 A | 2/2010 | | |
| JP | 2015-099559 A | 5/2015 | | |
| WO | WO-2020101362 A1 * | 5/2020 | | H04N 23/61 |
| WO | 2020/175298 A1 | 9/2020 | | |

OTHER PUBLICATIONS

Indian Office Action issued May 2, 2024, in corresponding Indian Patent Application No. 202244070592 (7 pages).

Office Action issued Sep. 5, 2025, in corresponding Japanese Application No. 2021-204438, with English translation (8 pages).

Korean Office Action issued Jan. 26, 2026, in corresponding Korean Application No. 10-2022-0165312.

Indian Office Action issued Apr. 17, 2026, in corresponding Indian Patent Application No. 202244070592, with English translation (3 pages).

Chinese Office Action issued Apr. 28, 2026, in corresponding Chinese Patent Application No. 202211613542.7, with English translation (25 pages).

\* cited by examiner

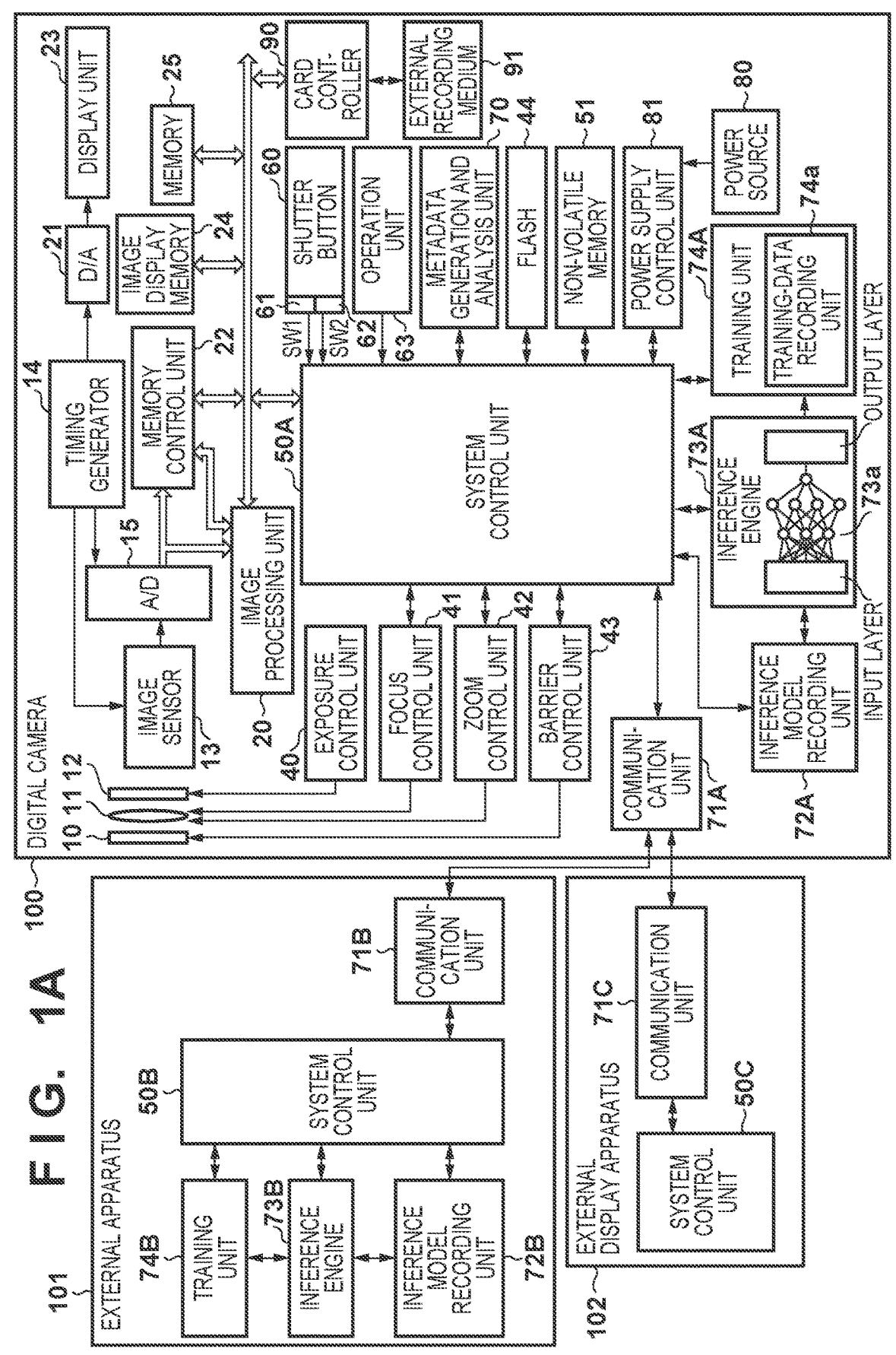
F I G. 1A

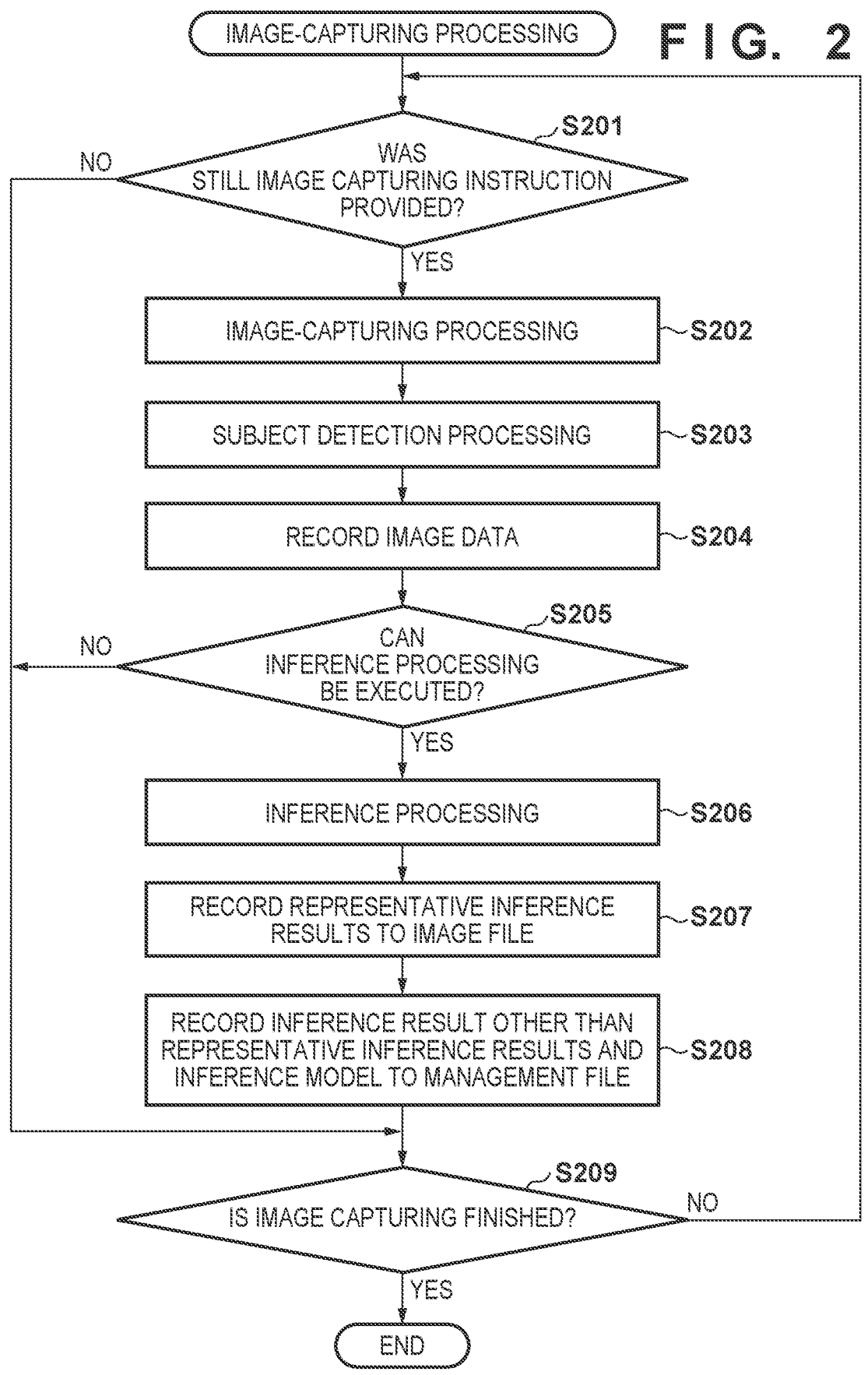
F I G. 2

F I G. 3
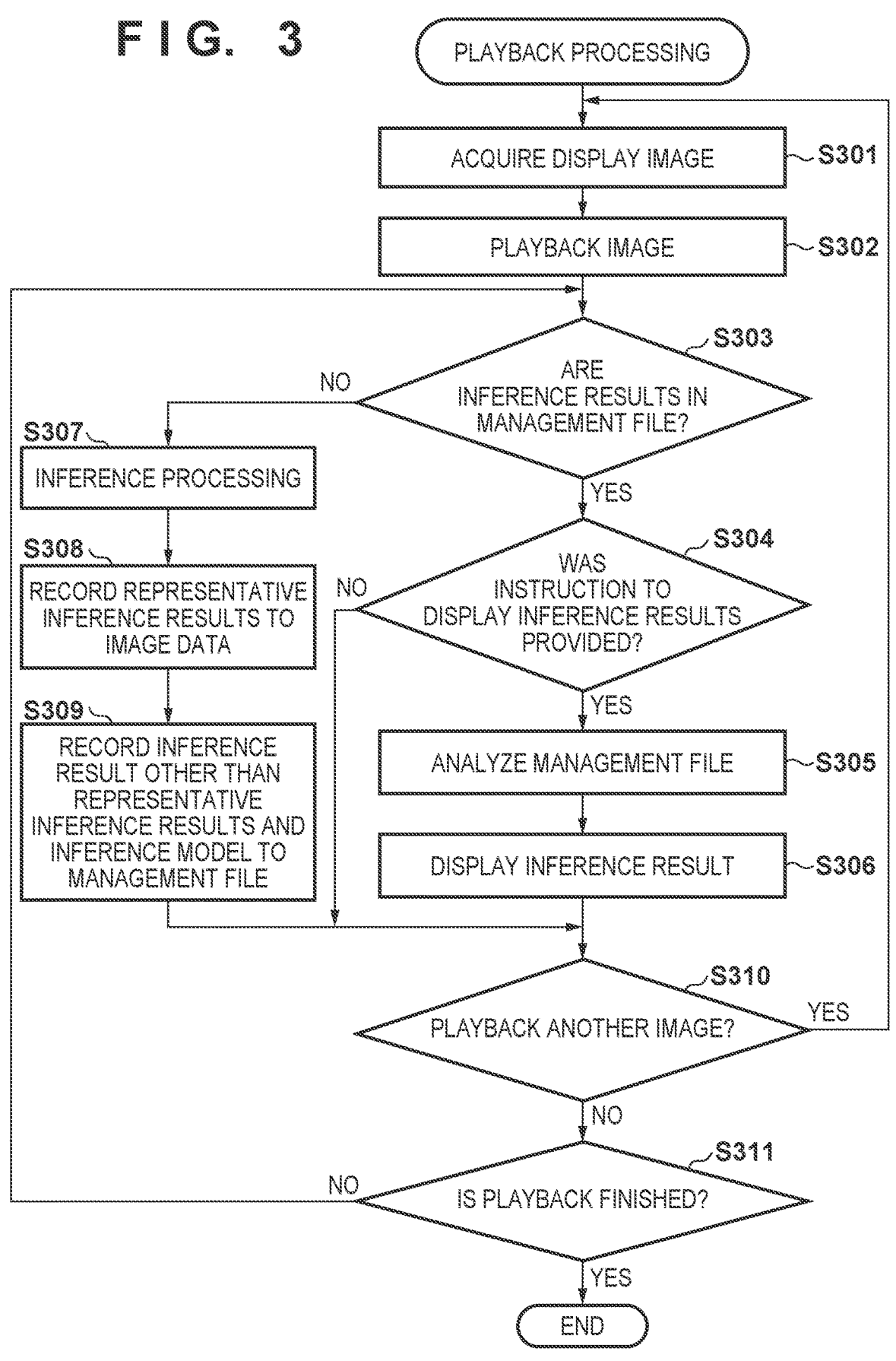

F I G. 4C
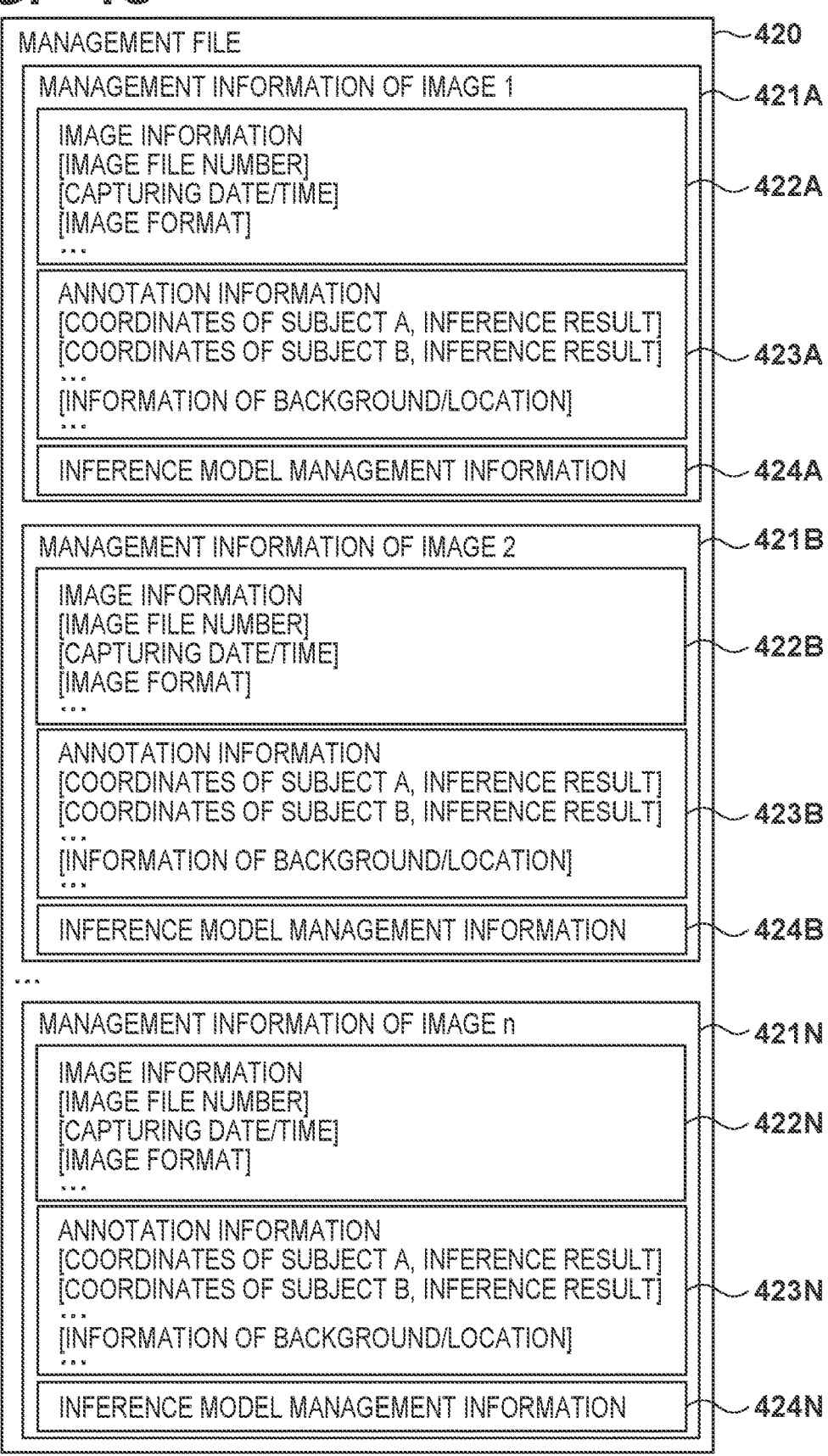

IMAGE PROCESSING APPARATUS, METHOD OF CONTROLLING THE SAME, AND A NON-TRANSITORY COMPUTER-READABLE STORAGE MEDIUM THAT OUTPUT INFERENCE RESULTS AND STORE MANAGEMENT INFORMATION OF IMAGES

CROSS REFERENCE TO PRIORITY APPLICATION

This application claims the benefit of Japanese Patent Application No. 2021-204438, filed on Dec. 16, 2021, which is hereby incorporated by reference herein in its entirety.

BACKGROUND OF THE INVENTION

Field of the Invention

The present disclosure relates to an image processing apparatus that processes images captured using a digital camera, or the like, a method for controlling the image processing apparatus, and a non-transitory computer-readable storage medium.

Description of the Related Art

In recent years, artificial intelligence (AI) technology, such as deep learning, is starting to be used in various technical fields. For example, a function for detecting people's faces from captured images was conventionally installed in digital cameras, and the like. However, Japanese Patent Laid-Open No. 2015-99559 discloses a technique in which the target of detection is not limited to people, and animals such as dogs and cats, etc., are accurately detected to recognize subjects.

On the other hand, with the progress of subject detection technology and the consequent increase in the significance of information that can be detected, images that are input as detection targets and the results detected therefrom have now become significant as information that can be used in various ways in the subsequent workflow. For example, various types of information estimated from images using AI technology, and the like, now play a very significant role as input data in various fields, such as robot automation and autonomous automobile driving.

However, Japanese Patent Laid-Open No. 2015-99559 does not disclose any method for managing information detected from input images.

In view of this, the present invention provides a method for managing information detected from input images, particularly a method for managing results of estimation of subjects in images.

SUMMARY OF THE INVENTION

One aspect of the embodiments relates to an image processing apparatus comprising a detection unit configured to detect subjects from an image, a processing unit configured to classify the detected subjects by performing inference processing, a generation unit configured to generate an image file that includes image data of the image and first inference results of the inference processing, and to record the image file in a recording medium, and a storing unit configured to store management information including information for specifying the image file and second inference results of the inference processing in a management file that is different from the image file and that is recorded in the recording medium.

Further features of the present invention will become apparent from the following description of exemplary embodiments (with reference to the attached drawings).

BRIEF DESCRIPTION OF THE DRAWINGS

FIG. 1A is a block diagram illustrating a schematic configuration of a system in an embodiment.

FIG. 2 is a flowchart illustrating one example of image-capturing processing according to the embodiment.

FIG. 3 is a flowchart illustrating one example of playback processing according to the embodiment.

FIG. 4C is a diagram illustrating one example of a data configuration of a management file according to the embodiment.

DESCRIPTION OF THE EMBODIMENTS

Figure 1B:
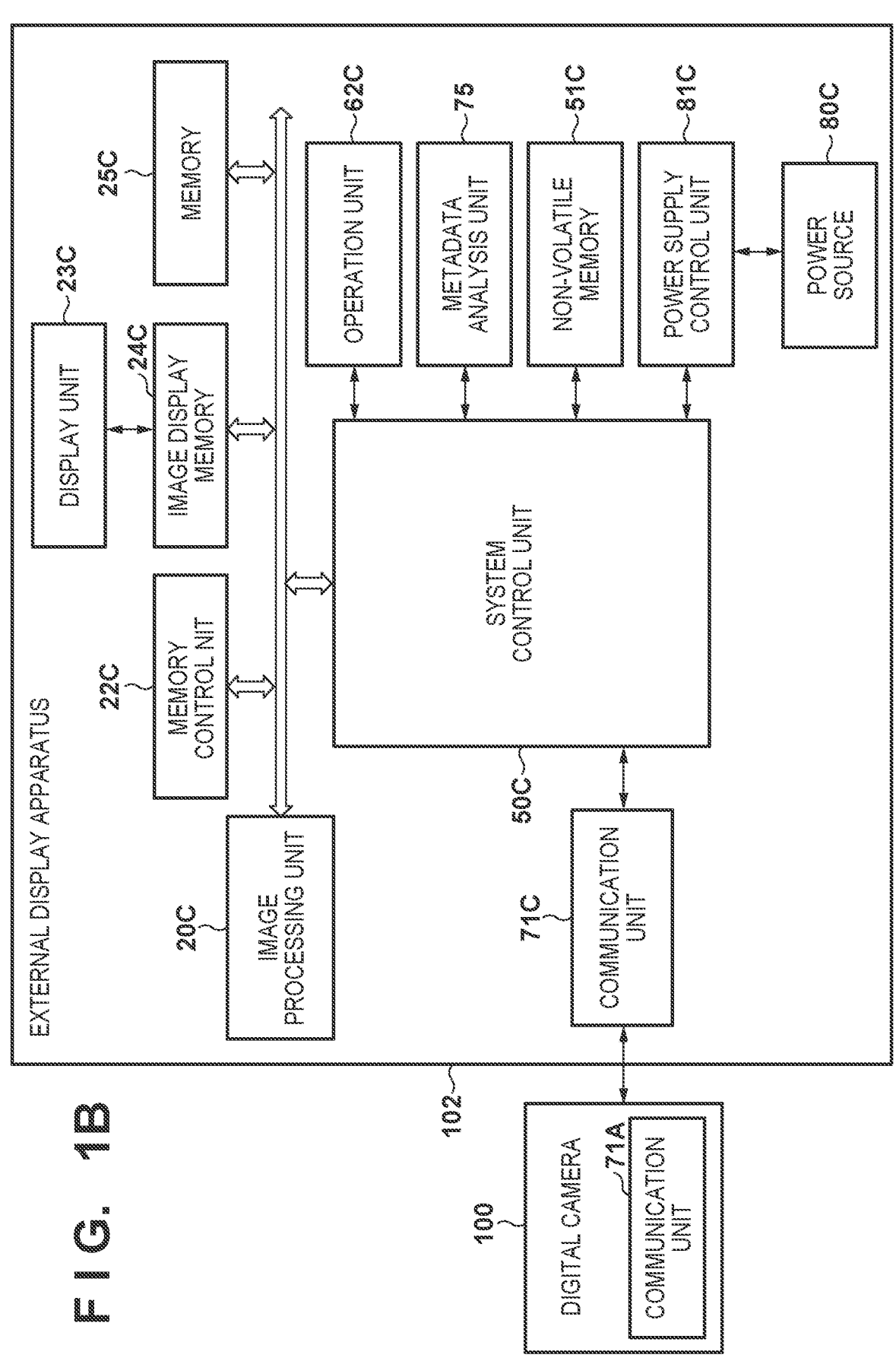
FIG. 1B is a block diagram illustrating a schematic configuration of an external display apparatus 102 according to the embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

Furthermore, while a digital camera, which is an image-capturing apparatus, will be described in the following description as one example implementation of an image processing apparatus that performs subject classification using an inference model, the image processing apparatus is not limited to being embodied as a digital camera. In the present embodiment, the image processing apparatus may be any image processing apparatus that reads images recorded in a recording medium and displays the images on a display device, and may, for example, be a mobile telephone, a smartphone, a tablet PC, a personal computer, or the like. Furthermore, "image processing apparatus" is one example of a name that can be used to refer to the digital camera, or the like, according to the embodiment, and the digital camera, or the like, according to the embodiment may also be referred to as "information processing apparatus", "image output apparatus", "image display apparatus", "image recording apparatus", etc.

FIG. 1A is a block diagram illustrating an example of a configuration of a system including a digital camera 100 according to the embodiment. In the present embodiment, the system is formed by communicably connecting the digital camera 100 to each of an external apparatus 101 and an external display apparatus 102. The digital camera 100 is an image processing apparatus as already mentioned above, and the external apparatus 101 is an apparatus that manages an inference model according to the present embodiment. The external display apparatus 102 is an external apparatus for displaying image files managed by the digital camera 100, and may be realized using a personal computer, a tablet terminal, a smartphone, or the like, for example.

The configuration of the digital camera 100 will be described below. First, a barrier 10 is a protective member that covers an imaging unit of the digital camera 100 including an imaging lens 11 and thereby prevents the imaging unit from being contaminated or broken, and the operation of the barrier 10 is controlled by a barrier control unit 43. The imaging lens 11 forms an optical image on an imaging surface of an image sensor 13. A shutter 12 has an aperture function. The image sensor 13 is constituted by a CCD, a CMOS sensor, or the like, for example, and converts an optical image formed on the imaging surface by the imaging lens 11 through the shutter 12 into an electrical signal.

An A/D converter 15 converts an analog image signal output from the image sensor 13 into a digital image signal. The digital image signal obtained by the conversion by the A/D converter 15 is written to a memory 25 as so-called RAW image data. In addition, development parameters corresponding to each piece of RAW image data are generated based on information obtained during image capturing, and the development parameters are written to the memory 25. The development parameters are constituted from various types of parameters to be used in image processing for recording in the JPEG format, or the like, including exposure settings, white balance, color space, contrast, and the like. A timing generator 14 is controlled by a memory control unit 22 and a system control unit 50A, and provides clock and control signals to the image sensor 13, the A/D converter 15, and a D/A converter 21.

An image processing unit 20 executes various types of image processing, such as predetermined pixel interpolation processing, color conversion processing, correction processing, and resizing processing, on data from the A/D converter 15 or the memory control unit 22. Furthermore, the image processing unit 20 executes predetermined image processing and calculation processing using captured image data, and provides the system control unit 50A with the calculation results that are obtained. The system control unit 50A realizes autofocus (AF) processing, automatic exposure (AE) processing, and pre-flash (EF) processing by controlling an exposure control unit 40 and a focus control unit 41 based on the provided calculation results.

Also, the image processing unit 20 executes predetermined calculation processing using captured image data, and executes automatic white balance (AWB) processing based on the calculation results that are obtained. Furthermore, the image processing unit 20 reads image data stored in the memory 25, and executes compression or decompression processing, such as compression or decompression processing in the JPEG, MPEG-4 AVC, or High Efficiency Video Coding (HEVC) format, or lossless compression on uncompressed RAW data. Then, the image processing unit 20 writes the processed image data to the memory 25.

Also, the image processing unit 20 executes predetermined calculation processing using captured image data, and performs editing processing on various types of image data. Specifically, the image processing unit 20 can perform trimming processing of adjusting the displayed image area and size by setting unnecessary portions around image data as undisplayed portions, and resizing processing of changing size by enlarging and shrinking image data, screen display elements, etc. Furthermore, the image processing unit 20 can perform RAW development in which data subjected to compression or decompression processing, such as lossless compression on uncompressed RAW data, is additionally subjected to image processing such as color conversion and then converted into the JPEG format to create image data. In addition, the image processing unit 20 can perform moving-image cut-out processing in which a designated frame of a moving-image format such as MPEG-4 is cut out, converted into the JPEG format, and stored.

Also, the image processing unit 20 performs processing of superimposing, on display image data, On-Screen Displays (OSDs) such as arbitrarily-defined characters and a menu to be displayed on a display unit 23. Furthermore, the image processing unit 20 performs subject detection processing in which input image data, subject distance information obtained from the image sensor 13, or the like, during image capturing, etc., are used to detect subjects present in image data and detect subject areas of the subjects. Detection information that can be obtained includes the areas of subjects, including the positions and sizes thereof in an image, the inclination of subjects, the probability of subjects, etc.

The memory control unit 22 controls the A/D converter 15, the timing generator 14, the image processing unit 20, an image display memory 24, the D/A converter 21, and the memory 25. RAW image data generated by the A/D converter 15 is written to the image display memory 24 or the memory 25 via the image processing unit 20 and the memory control unit 22, or directly via the memory control unit 22. Display image data written to the image display memory 24 is displayed on the display unit 23, which is constituted by a TFT LCD, or the like, via the D/A converter 21. An electronic viewfinder function for displaying a live image can be realized by displaying pieces of captured image data sequentially using the display unit 23. The memory 25 is provided with a sufficient amount of storage for storing a predetermined number of still images or a predetermined duration worth of moving images, and stores captured still images and moving images. Furthermore, the memory 25 can also be used as a work area for the system control unit 50A.

The exposure control unit 40 controls the shutter 12, which has the aperture function. Also, the exposure control unit 40 also has a flash adjustment function, which is realized in cooperation with a flash 44. The focus control unit 41 adjusts the focus by driving an unillustrated focus lens included in the imaging lens 11 based on an instruction from the system control unit 50A. A zoom control unit 42 controls zooming by driving an unillustrated zoom lens included in the imaging lens 11. The flash 44 has an AF-auxiliary light projection function and the flash adjustment function.

The system control unit 50A controls the entire digital camera 100. A non-volatile memory 51 is an electrically erasable and recordable non-volatile memory, and an EEPROM, or the like, is used, for example. Note that not only one or more programs for executing processing according to the present embodiment but also map information, etc., are recorded in the non-volatile memory 51.

A shutter switch 61 (SW1) turns on when a shutter button 60 is operated midway, and provides an instruction to start operations such as the AF processing, the AE processing, the AWB processing, and the EF processing. A shutter switch 62 (SW2) turns on when the shutter button 60 has been operated completely, and provides an instruction to start a sequence of image-capturing operations including exposure processing, development processing, and recording processing. In the exposure processing, a signal read from the image sensor 13 is written to the memory 25 as RAW image data via the A/D converter 15 and the memory control unit 22. In the development processing, RAW image data written to the memory 25 is developed by utilizing calculation performed by the image processing unit 20 and the memory control unit 22, and is written to the memory 25 as image data. In the recording processing, image data is read from the memory 25 and compressed by the image processing unit 20, and the compressed image data is stored in the memory 25 and then written to an external recording medium 91 via a card controller 90.

An operation unit 63 includes operation members such as various types of buttons and a touch panel. For example, the operation unit 63 includes a power button, a menu button, a mode switch for switching between an image-capturing mode, a playback mode, and other special image-capturing modes, arrow keys, a set button, a macro button, and a multi-screen playback page-break button. For example, the operation unit 63 further includes a flash setting button, and a single-shooting/continuous-shooting/self-timer switching button, a menu shift + (plus) button, a menu shift − (minus) button, an image-capturing image-quality selection button, an exposure correction button, a date/time setting button, etc.

Based on information obtained during image capturing, a metadata generation and analysis unit 70 generates various types of metadata conforming to the Exchangeable image file format (Exif) standard, or the like, that is added to image data when image data is recorded in the external recording medium 91. The Exif standard is a standard defining a data format of image files, and, specifically, is a standard that defines a data format for adding various types of information (metadata) indicating image-capturing conditions, settings, etc., to image data generated by the digital camera 100 and storing the image data and the information (metadata) together as a file. Furthermore, when image data recorded in the external recording medium 91 is read, the metadata generation and analysis unit 70 analyzes metadata appended to the image data. Examples of the metadata include image-capturing setting information applied during image capturing, image-data information relating to image data, feature information of subjects included in image data, etc., for example. Furthermore, when moving-image data is recorded, the metadata generation and analysis unit 70 can also generate and append metadata with respect to each frame.

A power source 80 is constituted from a primary battery such as an alkaline battery or a lithium battery, a secondary battery such as an NiCd battery, an NiNM battery, or an Li battery, an AC adapter, or the like. A power supply control unit 81 supplies power supplied from the power source 80 to parts of the digital camera 100. The card controller 90 performs the transmission and reception of data to and from the external recording medium 91, which is a memory card, or the like. The external recording medium 91 is constituted by a memory card, for example, and records images (still images, moving images) captured by the digital camera 100.

An inference engine 73A uses an inference model recorded in an inference model recording unit 72A to perform inference on image data input thereto via the system control unit 50A. As the inference model, an inference model input from the outside (e.g., the external apparatus 101) via a communication unit 71A and recorded in the inference model recording unit 72A, or an inference model obtained by performing re-training using a training unit 74A can be used. Note that, if the inference model is updated from the outside and updated by being re-trained using the training unit 74A, management versions of the updated inference models are held in the inference model recording unit 72A, or the like, so that the individual inference models can be identified. Furthermore, the inference engine 73A has a neural network design 73a.

In the neural network design 73a, intermediate layers (neurons) are arranged between an input layer and an output layer. Image data is input to the input layer from the system control unit 50A. Several layers of neurons are arranged as the intermediate layers. The number of neuron layers is set, as appropriate, from a design standpoint, and the number of neurons in each layer is also set, as appropriate, from a design standpoint. The intermediate layers are weighted based on the inference model recorded in the inference model recording unit 72A. Annotation information corresponding to the image data input to the input layer is output to the output layer.

In the present embodiment, an inference model that infers classifications of subjects included in images is contemplated. As the inference model, an inference model that has been generated by the external apparatus 101, or the like, through deep learning in which image data of various subjects and classification results thereof (for example, animal classifications such as "dog" and "cat", subject classifications such as "person", "animal", "plant", and "building", etc.) are used as training data. However, because the inference engine 73A can be updated from the external apparatus 101, or the like, there would be no problem in handling other various inference models.

The training unit 74A re-trains the inference model upon receiving a request from the system control unit 50A, or the like. The training unit 74A includes a training-data recording unit 74a, which records information relating to training data to be input to the inference engine 73A. The training unit 74A can re-train the inference engine 73A using the training data recorded in the training-data recording unit 74a, and update the inference engine 73A using the inference model recording unit 72A.

The communication unit 71A includes a communication circuit for performing transmission and reception. Specifically, the communication circuit may perform wireless communication such as Wi-Fi or Bluetooth (registered trademark) communication, or may perform wired communication such as Ethernet or USB communication. The communication unit 71A can communicate with a communication unit 71B of the external apparatus 101 and a communication unit 71C of the external display apparatus 102. The communication unit 71A functions as a communication unit that transmits and receives, to and from the system control unit 50A, a system control unit 50B, and a system control unit 50C, not only image files to which annotation information created by the inference engine 73A is appended, but also various types of information such as inference models and training data. Furthermore, the communication unit 71A can impose restrictions on transmitted information based on whether the external apparatus 101 and the external display apparatus 102 are correlated with the digital camera 100.

The external apparatus 101 includes a training unit 74B, an inference engine 73B, an inference model recording unit 72B, the system control unit 50B, and the communication unit 71B. Alternatively, the external apparatus 101 may be an apparatus that does not have such components. The training unit 74B creates an inference model upon receiving a request from the outside (e.g., the inference engine 73B, the system control unit 50B, or the like). The inference model recording unit 72B records inference models that are transmitted from the digital camera 100 and inference models that are created by the training unit 74B.

FIG. 1B illustrates an example of a detailed configuration of the external display apparatus 102. The external display apparatus 102 includes an image processing unit 20C, a memory control unit 22C, a display unit 23C, an image display memory 24C, a memory 25C, a non-volatile memory 51C, an operation unit 62C, the communication unit 71C, a metadata analysis unit 75, a power source 80C, and the power supply control unit 81C. The external display apparatus 102 can receive image files, etc., from the digital camera 100 via the communication unit 71C, and display the image files, etc., received by the system control unit 50C on the display unit 23C.

Next, image-capturing processing of the digital camera 100 in the present embodiment will be described with reference to FIG. 2. For example, the processing according to this flowchart can be realized by the system control unit 50A executing a corresponding program (stored in the non-volatile memory 51, or the like) and controlling the functional blocks of the digital camera 100.

The processing is started when an instruction indicating the image-capturing mode is provided using the mode switch included in the operation unit 63. In step S201, it is checked whether an instruction to capture a still image has been provided by a user pressing down the shutter button 60 and the shutter switches 61 and 62 (SW1 and SW2) consequently turning on, and processing proceeds to step S202 if an instruction to capture a still image has been provided.

Image-capturing processing is performed in step S202. In the image-capturing processing, the autofocus (AF) processing and the automatic exposure (AE) processing are performed using the focus control unit 41 and the exposure control unit 40, and then an image signal output from the image sensor 13 via the A/D converter 15 is stored in the memory 25. Furthermore, image data is created in which the image signal stored in the memory 25 is compressed in the JPEG or MPEG-4 HEVC format in accordance with user settings using the compression processing included in the image processing unit 20.

In step S203, subject detection processing is performed by the image processing unit 20 on the image signal stored in the memory 25, and detection information of subjects included in the image is acquired.

Figure 4A:
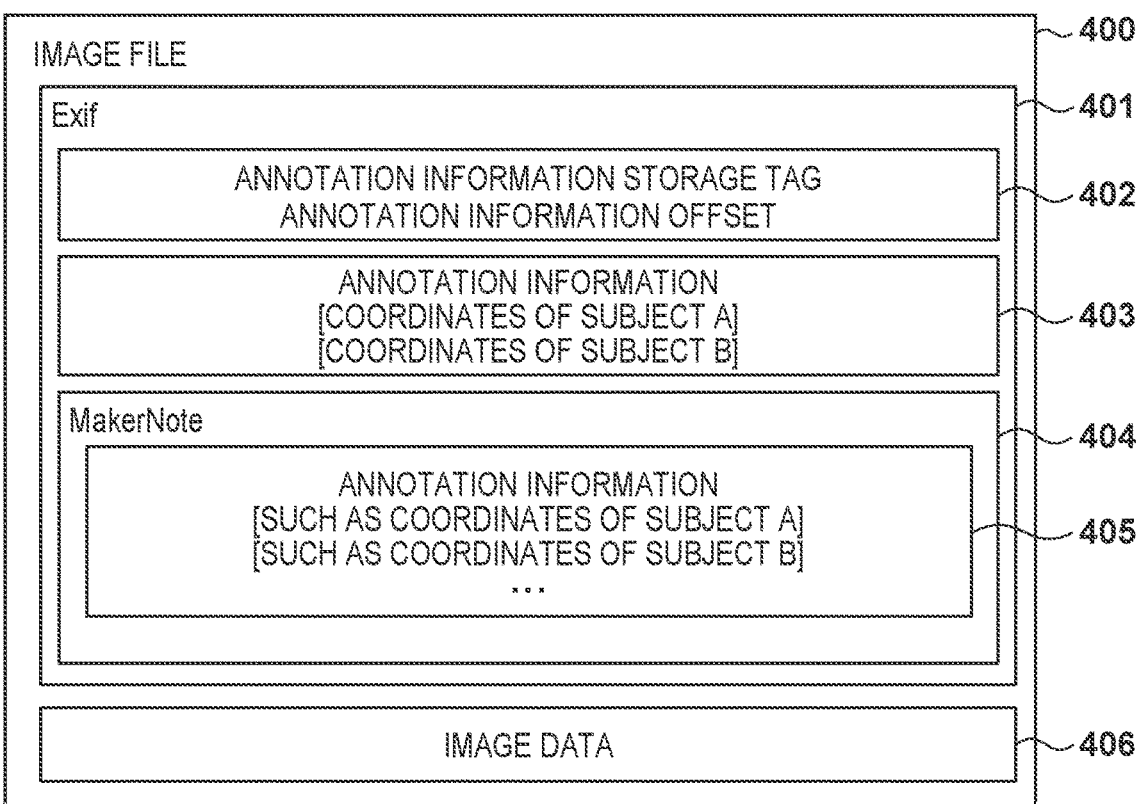
FIG. 4A is a diagram illustrating one example of a data configuration of an image file according to the embodiment.

In step S204, the image data created in step S202 and the subject detection information acquired in step S203 are recorded in the external recording medium 91 as an image file. The image file recorded here is recorded in a format as illustrated in FIG. 4A. An image file 400 recorded in the present embodiment is constituted from an area in which metadata conforming to the Exif standard is at least stored, and an image data area in which compressed image data 406 is stored. For example, if an instruction to perform recording in the JPEG format has been provided from the user, the image file 400 is recorded in the JPEG format, and Exif data 401 is recorded in the APP1 marker, or the like. Also, if an instruction to perform recording in the High Efficiency Image File Format (HEIF) format has been provided from the user, the image file 400 is recorded in the HEIF file format, and the Exif data 401 is recorded in a Metadata Box, or the like. Furthermore, if an instruction to perform recording in the RAW format has been provided, the Exif data 401 is similarly recorded in a predetermined area such as a Metadata Box.

Using the metadata generation and analysis unit 70, the subject detection information acquired in step S203 is stored in MakerNote 404 included in the Exif data 401. The manufacturer (or the vendor, the same hereafter) of the digital camera 100 can record MakerNote 404 in a recording format unique to itself, and only the manufacturer itself can comprehend the contents of MakerNote 404 because the internal specification and format thereof is not disclosed in the Exif standard, and the like. In addition, MakerNote 404 is an area that can be used only with genuine software produced by the vendor (for example, an application installed to a personal computer, a tablet terminal, or a smartphone, or a web service that is accessible from such terminals, and the like). MakerNote 404 includes an annotation information 405. Furthermore, the subject detection information is recorded in annotation information 403 that is recorded in a position indicated by annotation information offset included in an annotation link information storage tag 402. The subject detection information recorded in the annotation information 403 is used as annotation information to be input to the inference engine 73A as input data in the later-described inference processing. In the example illustrated in FIG. 4A, only coordinate areas of subjects within a screen are recorded in the annotation information 403. However, information other than this may also be included.

In step S205, it is checked whether inference processing using the inference engine 73A can be executed. For example, the inference processing cannot be executed in cases such as when the inference engine 73A is currently executing processing on another image, or when an instruction to perform image capturing in a continuous shooting mode is provided by the shutter button 60 being operated and the shutter switch 62 (SW2) consequently remaining on, in which case image-capturing processing is to be prioritized over the inference processing. Processing proceeds to step S209 if the inference processing cannot be executed, and proceeds to step S206 if the inference processing can be executed.

In step S206, the inference processing using the inference engine 73A is performed on the image file 400. In the present embodiment, the image file 400 is input as the input to the inference engine 73A. Subject areas included in the image data are specified from the annotation information 403 and the image data 406 included in the image file 400, and classification results of the subjects included in the subject areas are output as a result of inference being performed on each subject area using the inference engine 73A. When the inference is performed, information relating to the inference processing, such as a log and debug information relating to operations performed during the inference, may be output besides the inference results.

Figure 4B:
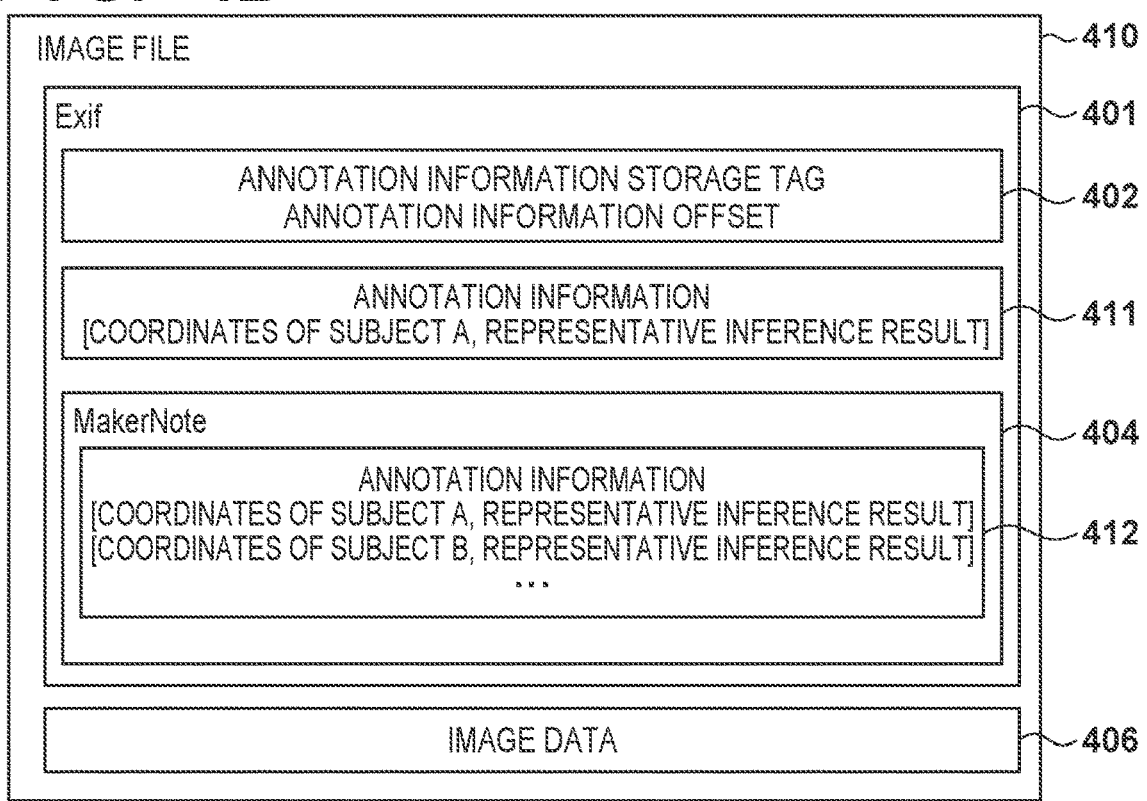
FIG. 4B is a diagram illustrating another example of the data configuration of the image file according to the embodiment.

In step S207, the subject classification results (i.e., the inference results acquired in step S206) are classified into first inference results and second inference results, which are inference results other than the first inference results, according to a predetermined criterion, the first inference results are recorded in the image file, and processing proceeds to step S208. FIG. 4B illustrates the image file 410 obtained after representative inference results of the individual subjects have been recorded as the first inference results in the image file 400 in FIG. 4A. Using the metadata generation and analysis unit 70, in the image file 410, a representative inference result of a representative subject is recorded in annotation information 411, and representative inference results of the individual subjects including the main subject are recorded in annotation information 412 in MakerNote 404.

Here, for example, as the above-described predetermined criterion, one of the following criteria can be adopted: whether an inference result has the highest reliability, or whether an inference result is for the main subject. In the following, the details of the predetermined criterion will be described in specific.

First, in regard to reliability, the image processing unit 20 can determine the reliability of inference results at least partially based on at least one of a plurality of image-capturing conditions including: the sizes of the subject areas, the blur of the subject areas, whether the subject areas are concealed by other subject areas or partially cut off, and the exposure and brightness when the subjects were image captured. For example, the reliability may have a maximum value and a minimum value of one hundred and zero, respectively. Specifically, the reliability of an inference result would be high if the subject area is image captured under image-capturing conditions that are suitable for subject classification, e.g., if the subject area is image captured without any blur and without being concealed by another subject or being cut off, and with appropriate exposure and brightness. On the other hand, the reliability of an inference result would be low if the subject area is image captured under image-capturing conditions that are not suitable for subject classification, e.g., if the subject area is image captured in a blurred state or so as to be concealed by another subject or cut off, or is image captured under a backlit condition or in a very dark environment.

Next, in regard to the main subject, the main subject and subjects other than the main subject can be determined from among subjects detected from the image data based on at least one of: the sizes of the subject areas in the image data, the sizes of a specific part of the subjects in the image data, and the displacement amount from the image center position. Specifically, a subject corresponding to the largest subject area in the image data, a subject for which the size of a specific part, such as the face, is largest in the image data, or a subject for which the displacement amount from the center position in the image data is smallest, or, in other words, the subject that is closest to the center position may be determined as the main subject. Furthermore, a subject detected within an area designated by the user of the digital camera 100 may be determined as the main subject.

In the example illustrated in FIG. 4B, a plurality of subjects at least including subjects A and B are detected from the image data 406, and, among the subjects, subject A is determined as the main subject and the representative inference result of subject A is recorded in the annotation information 411. Furthermore, representative inference results of the individual ones of the plurality of subjects detected from the image data 406 are recorded in MakerNote 404. In such a manner, inference processing results, which constitute technical know-how and assets, can be handled as follows: while holding some information in an area which can be shared among manufacturers, the description format of which is already disclosed in the Exif standard, and the like, most of the information can be held and protected in an area unique to the manufacturer, the description format of which is not disclosed in the Exif standard, and the like.

Next, in step S208, the inference results that were not classified as the first inference results (i.e., the second inference results) are recorded in a management file, which is a file in the external recording medium 91 that is different from the image file. If a management version, debug information, etc., of the current inference model is held in the inference model recording unit 72A, such information is recorded in the management file as inference model management information. While image files are configured as independent files for individual images, the management file may be configured so that information regarding a plurality of image files is included in one file.

Because the management file is not a type of file that is created each time image data 406 is generated, the management file may be created in advance in the external recording medium 91 and information corresponding to image files may be added thereto each time an image file is created. In doing so, a management file can be created independently for each user using the digital camera 100.

Furthermore, the management file may be recorded in a recording format unique to the manufacturer, and the management file may be created so that the contents thereof can only be comprehended by the manufacturer itself because the internal specification and format thereof is not disclosed in the DCF standard, the Exif standard, and the like. In addition, the management file may be configured so that the management file can be used (can be referred to) only with predetermined genuine software produced by the manufacturer (for example, an application installed to a personal computer, a tablet terminal, or a smartphone, or a web service that is accessible from such terminals, and the like).

In subsequent step S209, once an instruction to finish image capturing is provided from the user by using the mode switch included in the operation unit 63 being operated or as a result of power being turned off using the power button included in the operation unit 63, the image-capturing processing is terminated.

FIGS. 4A to 4C are drawings illustrating examples of data configurations of the image file and the management file according to the present embodiment. FIG. 4A illustrates one example of a configuration of the image file in a case in which the image data created in step S202 and the subject detection information acquired in step S203 are recorded in the external recording medium 91 as an image file in step S204. FIG. 4B illustrates one example of a configuration of the image file 410 obtained after some inference results have been recorded in the image file 400 in FIG. 4A. FIG. 4C illustrates one example of a configuration of the management file 420 having the inference results, the inference model management information, etc., recorded therein.

In FIG. 4B, using the metadata generation and analysis unit 70, the representative inference result of the main subject is associated with the positional coordinates of the subject and recorded in the annotation information 411 in the image file 410. Because the annotation information 411 is recorded in a format that is defined in the Exif standard, the annotation information 411 can be used regardless of the manufacturer of the digital camera 100. Furthermore, as the annotation information 412 in MakerNote 404, the representative inference results of the main subject and the other subjects are recorded so as to be individually associated with the positional coordinates of the subjects. In the present embodiment, the inference results recorded in the image file 410 are collectively referred to as the first inference results.

The management file 420 illustrated in FIG. 4C stores pieces of management information 421A to 421N individually for n image files (where n is a natural number of one or two or more). Here, management information 421A indicates management information corresponding to the image file 410 illustrated in FIG. 4B. While image files corresponding to the other pieces of management information (i.e., management information 421B, etc.) also exist in a similar format, such image files are omitted in FIG. 4B. The pieces of management information 421A to 421N have recorded therein pieces of image information 422A to 422N for specifying the corresponding image files 410. For example, an image-file number, an image-capturing date and time, an image format, etc., can be included in the image information 422, and the corresponding image file 410 can be specified based on the image-file number among such pieces of information. Furthermore, FIG. 4C illustrates, as one example, a case in which, in each one of pieces of annotation information 423A to 423N, all inference results including the first inference results recorded in the image file 410 are recorded for the individual subjects so as to be associated with the positional coordinates of the individual subjects. In addition, inference model management information 424 is also recorded in each piece of management information 421.

In the present embodiment, an example is described in which the pieces of annotation information 411, 412, and 423 are each constituted by combinations of positional coordinates and inference results. However, it is sufficient as long as results that are output as inference results of an inference model can be recorded in the annotation information. For example, the output results may be directly recorded in the annotation information, and the recording format or form in doing so is not limited, i.e., the output results may be recorded in text form, binary form, or the like.

In such a manner, the image data 406 and some inference results among the plurality of inference results (for example, the representative inference results among the plurality of inference results) are recorded in the image file 410. Thus, once the recording is complete, the image data 406 and the inference results can be efficiently correlated and easily managed, and do not have to be separately managed. Furthermore, the processing for generating the image file 410 can be simplified by only recording representative inference results therein, and file size can also be reduced. In addition, the inference model management information 424, which is unique data to be used by the manufacturer managing the inference models, can be correlated with the inference results and safely managed by not being made widely open to the public and being recorded in the undisclosed management file 420.

In the description above, representative inference results are recorded in the image file, and all inference results are recorded in the management file. However, in a case in which whether an inference result is for the main subject is adopted as the predetermined criterion, all inference results for the main subject may be recorded in the image file, and all inference results for all subjects may be recorded in the management file. In this case, it is sufficient that, in the image file, the representative inference result of the main subject be recorded in the annotation information 411, and all inference results of the main subject be recorded in the annotation information 412. It is sufficient that the representative inference result in this case be determined according to whether an inference result has the highest reliability.

Furthermore, in the annotation information 412 in the image file and the annotation information 423 in the management file, only differences from the annotation information 411 and the annotation information 412 may be recorded therein, rather than recording all inference results therein. In addition, rather than making the determination based on the reliability of inference results, whether inference results are for the main subject, etc., predetermined items among inference results may be adopted as representative inference results. For example, it may be determined beforehand that representative inference results are pieces of information indicating whether a subject is a person, whether a subject is an animal, etc., and the other inference results are pieces of information such as the personal name, sex, and age of subjects.

Next, playback processing of the digital camera 100 according to the embodiment will be described, with reference to FIG. 3. For example, the processing according to this flowchart can be realized by the system control unit 50A executing a corresponding program (stored in the non-volatile memory 51, or the like) and controlling the functional blocks of the digital camera 100.

In the digital camera 100, playback processing for viewing image data recorded in the external recording medium 91 is started when an instruction indicating the playback mode is provided using the mode switch included in the operation unit 63. Once the playback processing is started, in step S301, one image file to be played back is specified and loaded from the external recording medium 91 to the memory 25 via the card controller 90.

In step S302, the image file loaded to the memory 25 is subjected to decompression processing, resizing processing, etc., by the image processing unit 20 in accordance with the recording format thereof and converted into display image data, and the display image data is recorded in the image display memory 24 and displayed by the display unit 23.

In step S303, the metadata generation and analysis unit 70 checks whether inference results for the image file being currently played back are already recorded in the management file 420. Processing proceeds to step S304 if inference results are already recorded, and processing proceeds to step S307 if inference results are not recorded yet. In step S304, if an instruction to display inference results already recorded in the image file is provided from the user by using an operation member included in the operation unit 63, processing proceeds to step S305. Otherwise, processing proceeds to step S310.

In step S305, the metadata generation and analysis unit 70 analyzes the management file 420, specifies management information of the image file being currently played back from among the pieces of management information 421, and acquires annotation information 423, whereafter processing proceeds to step S306. In step S306, the metadata generation and analysis unit 70 extracts information relating to inference results from the annotation information 423, and uses the image processing unit 20 to display the extracted information so as to be superimposed on the image data being currently played back. For example, inference results associated with the image data are displayed so that the user can see by displaying, together with frames indicating coordinate areas of the individual subjects described in the annotation information 423, character strings indicating the inference results obtained by classifying the subjects inside the coordinate areas. Then, processing proceeds to step S310.

In step S307, processing similar to that in step S206 is performed, and processing proceeds to step S308. Similarly to step S207, in step S308, the subject classification results (i.e., the inference results acquired in step S307) are classified into first inference results and second inference results, which are inference results other than the first inference results, the first inference results are recorded in the image file 410, and processing proceeds to step S309. Similarly to step S208, in step S309, the second inference results (i.e., the inference results that were not classified as the first inference results), image information, inference model management information, etc., are recorded in the management file 420, which is a file that is different from the image file 410. Here, the first inference results are also recorded in the management file. Then, processing moves on to step S310.

In step S310, if an instruction to play back another image is provided using an operation member included in the operation unit 63, processing returns to step S301 and the above-described processing is repeated for the playback image indicated by the instruction. On the other hand, if an instruction to play back another image is not provided, it is determined in step S311 whether an instruction to terminate the playback processing has been provided, and processing returns to step S303 and the above-described processing is repeated if an instruction to terminate the playback processing is not provided, whereas the playback processing is terminated if an instruction to terminate the playback processing is provided.

In the present embodiment, by recording only the first inference results (i.e., representative inference results) in the image file 410, the processing performed by the metadata generation and analysis unit 70 to display inference results is reduced, and processing speed can be increased. The management file 420 can be used if detailed inference results are necessary. Because pieces of management information 421 for a plurality of image files are recorded in the management file 420, the metadata generation and analysis unit 70 can acquire and use inference results for a plurality of image files at once by analyzing one management file 420.

Next, transmission processing of the digital camera 100 in the present embodiment will be described with reference to FIG. 5. Here, a description will be provided taking as an example a case in which image files, prior to transmission thereof, are recorded in the format of the above-described image file 410, and the management file 420 is also recorded.

Figure 5:
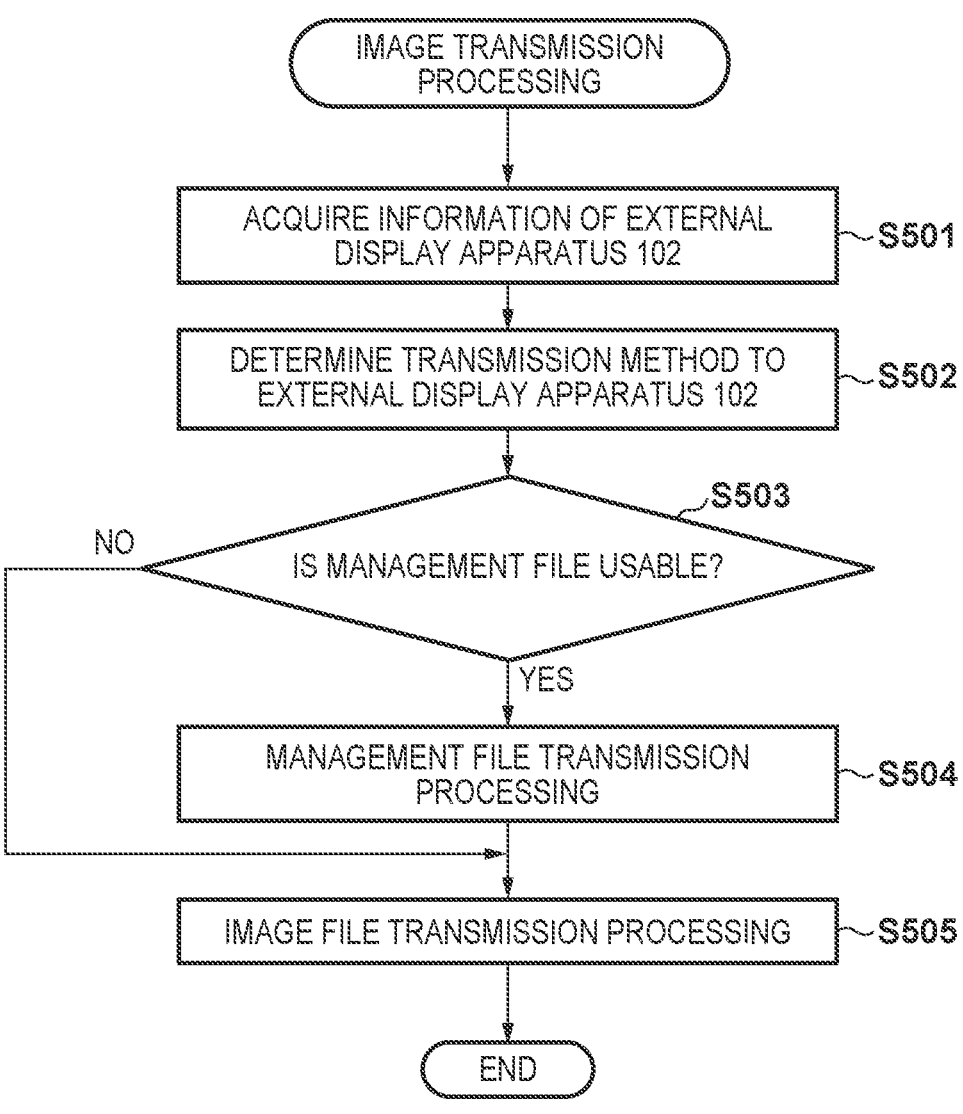
FIG. 5 is a flowchart illustrating one example of image transmission processing according to the embodiment.

When an instruction of transmission is provided using an operation member included in the operation unit 63, the transmission processing illustrated in the flowchart in FIG. 5 is started. The instruction of transmission may be provided as follows: transmission is started as a result of one or more image files being selected as targets, a setting is made in advance such that automatic transmission is performed when an image is captured, and transmission is triggered by the generation of an image file. Here, a description will be provided taking as an example a case in which image files, prior to transmission thereof, are recorded in a format such as that of the image file 410 in FIG. 4B described above, and the management file is recorded in a format such as that of the management file 420 in FIG. 4C described above. For example, the processing according to the flowchart in FIG. 5 can be realized by the system control unit 50A executing a corresponding program (stored in the non-volatile memory 51, or the like) and controlling the functional blocks of the digital camera 100.

In FIG. 5, a request for system information is made to the external display apparatus 102 via the communication unit 71A of the digital camera 100, and the external display apparatus 102 transmits system information from the system control unit 50C to the digital camera 100 via the communication unit 71C in step S501. Thus, the digital camera 100 can acquire system information of the external display apparatus 102. Then, processing proceeds to step S502.

In step S502, the system control unit 50A determines the method of transmission to the external display apparatus 102. Specific examples of transmission methods include wireless transmission such as Wi-Fi or Bluetooth (registered trademark) transmission, wired transmission via an Ethernet cable or a USB cable, transmission using a removable medium such as an SD card, etc. As the method for determining the transmission method to be used, if a plurality of transmission methods are available for use, a transmission method set by the user using an operation member included in the operation unit 63 may be used, or the transmission method to be used may be determined from the state of connection between the external apparatus 101 and the digital camera 100. If only one transmission method is available for use, this transmission method may be determined as the transmission method to be used.

In subsequent step S503, the system control unit 50A determines whether the external display apparatus 102 can use the management file 420 from the system information of the external display apparatus 102 acquired in step S501. As described above, because the management file 420 is recorded in a description format that is unique to the manufacturer and that is not disclosed in the Exif standard, and the like, the management file 420 can be referred to using only a specific application or web service. Here, it is assumed that the external display apparatus 102 is a tablet terminal, and an application provided by the manufacturer of the digital camera 100, or an application that is compatible with the application provided by the manufacturer is installed in the tablet terminal. In this case, the digital camera 100 and the external display apparatus 102 are connected using the application, and the system information provided from the external display apparatus 102 includes information indicating that the application is already installed. Because the management file 420 can be referred to by using the application, it can be determined that the external display apparatus 102 can use (refer to) the management file 420 if the application is already installed therein.

In addition to the above, the determination of whether the external display apparatus 102 can use the management file 420 may be performed based on whether or not a response is returned when a predetermined communication command (for example, a communication command unique to the manufacturer) is transmitted from the digital camera 100 to the external display apparatus 102. Furthermore, based on the received system information, the determination can be performed based on information as to whether user registration has been completed or whether a charge has been paid, etc. In regard to user registration, it may be determined that the external display apparatus 102 can use the management file 420 only if a comparison with user information of the digital camera 100 is performed and there is a match with the user information. This is beneficial for protecting the management file 420 in a case such as when a third party accesses the digital camera 100 using an application provided by the manufacturer, etc., to maliciously use the digital camera 100.

If it is determined that the external display apparatus 102 can use the management file 420, processing proceeds to step S504, and transmission processing of the management file 420 is executed. On the other hand, if the external display apparatus 102 cannot use the management file 420, this transmission processing is skipped and processing proceeds to step S505.

In subsequent step S504, the system control unit 50A performs transmission processing of the target management file via the communication unit 71A using the method for transmission to the external display apparatus 102 determined in step S502, and processing then proceeds to step S505. The external display apparatus 102 can display inference results on the display unit 23C by analyzing the management file received from the communication unit 71C using the metadata analysis unit 75 in a manner similar to that in step S305. In step S505, transmission processing of one or more target image files is performed using the transmission method determined in step S502, and processing is terminated.

In such a manner, according to the above-described transmission processing, the leakage of technical know-how and assets (data that cost a significant amount of money to create) to unspecified transmission destinations can be prevented by transmitting the management file only to specific transmission destinations.

Other Embodiments

Note that the present invention may be applied to a system constituted from a plurality of devices (for examples, a host computer, an interface device, a scanner, a video camera, etc.) or to an apparatus constituted from a single device (for example, a copy machine, a facsimile machine, or the like).

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more processors;
a memory; and
a program stored in the memory that, when executed by the one or more processors, causes the one or more processors to perform:
  detecting a plurality of subjects including a main subject and another subject from an image;
  performing inference processing for classifying the plurality of detected subjects to acquire inference results including first inference results and second inference results, wherein the first inference results are at least a portion of inference results of the inference processing for the main subject among the plurality of detected subjects and the second inference results include inference results of the inference processing for the other subject among the plurality of detected subjects;
  generating an image file that includes image data of the image and the first inference results for the main subject without the second inference results for the other subject, and recording the image file in a recording medium, wherein the first inference results are included in the image file according to a first format defined in a predetermined standard; and
  storing management information, including information for specifying the image file and the second inference results for the other subject, in a management file that is different from the image file and that is recorded in the recording medium according to a second format, wherein the second format, which is unique to a manufacturer of the image processing apparatus, does not allow use of the management file without using software from the manufacturer.

2. The image processing apparatus according to claim 1, wherein the management information further includes information regarding an inference model used by a processing unit for the inference processing.

3. The image processing apparatus according to claim 1, wherein the main subject is determined, from among the plurality of detected subjects, based on at least one of sizes of the subject areas in the image, sizes of a specific part of the subjects in the image, and a displacement amount of the subjects from a center position of the image.

4. The image processing apparatus according to claim 1, wherein the main subject is a subject detected within a designated area in the image.

5. The image processing apparatus according to claim 1, wherein the management information further includes the first inference results.

6. The image processing apparatus according to claim 1, wherein the management file includes pieces of the management information respectively associated with a plurality of image files.

7. The image processing apparatus according to claim 1, wherein the program stored in the memory that, when executed by the one or more processors, further causes the one or more processors to perform:
  determining whether an external display apparatus that is connected to the image processing apparatus can use the management file; and
  transmitting the image file to the external display apparatus,
  wherein, in the transmitting, the image file and the management file are transmitted to the external display apparatus if it is determined in the determining that the external display apparatus can use the management file, and, in the transmitting, only the image file is transmitted to the external display apparatus if it is determined in the determining that the external display apparatus cannot use the management file.

8. The image processing apparatus according to claim 7, wherein, in the determining, it is determined that the external display apparatus can use the management file if the external display apparatus uses predetermined software that can be used to refer to the management file.

9. The image processing apparatus according to claim 7, wherein, in the determining, it is determined that the external display apparatus can use the management file if the external display apparatus returns a response to a predetermined command.

10. The image processing apparatus according to claim 7, wherein, in the determining, it is determined that the external display apparatus can use the management file if a predetermined user registration has been performed on the external display apparatus.

11. The image processing apparatus according to claim 1, further comprising an image sensor for capturing the image.

12. A method of controlling an image processing apparatus, the method comprising:

detecting a plurality of subjects including a main subject and another subject from an image;

performing inference processing for classifying the plurality of detected subjects to acquire inference results including first inference results and second inference results, wherein the first inference results are at least a portion of inference results of the inference processing for the main subject among the plurality of detected subjects and the second inference results include inference results of the inference processing for the other subjects of the plurality of detected subjects;

generating an image file that includes image data of the image and the first inference results for the main subject without the second inference results for the other subject, and recording the image file in a recording medium, wherein the first inference results are included in the image file according to a first format defined in a predetermined standard; and storing management information, including information for specifying the image file and the second inference results for the other subject, in a management file that is different from the image file and that is recorded in the recording medium according to a second format, wherein the second format, which is unique to a manufacturer of the image processing apparatus, does not allow usage of the management file without using software from the manufacturer.

13. A non-transitory computer-readable storage medium storing one or more programs including instructions that, when executed by a processor of an image processing apparatus, cause the image processing apparatus to perform:

detecting a plurality of subjects including a main subject and another subject from an image;

performing inference processing for classifying the plurality of detected subjects to acquire inference results including first inference results and second inference results, wherein the first inference results are at least a portion of inference results of the inference processing for the main subject among the plurality of detected subjects and the second inference results include inference results of the inference processing for the other subjects of the plurality of detected subjects;

generating an image file that includes image data of the image and the first inference results for the main subject without the second inference results for the other subject, and recording the image file in a recording medium, wherein the first inference results are included in the image file according to a first format defined in a predetermined standard; and storing management information, including information for specifying the image file and second inference results for the other subject, in a management file that is different from the image file and that is recorded in the recording medium according to a second format, wherein the second format, which is unique to a manufacturer of the image processing apparatus, does not allow usage of the management file without using software from the manufacturer.

* * * * *